Figure 1:
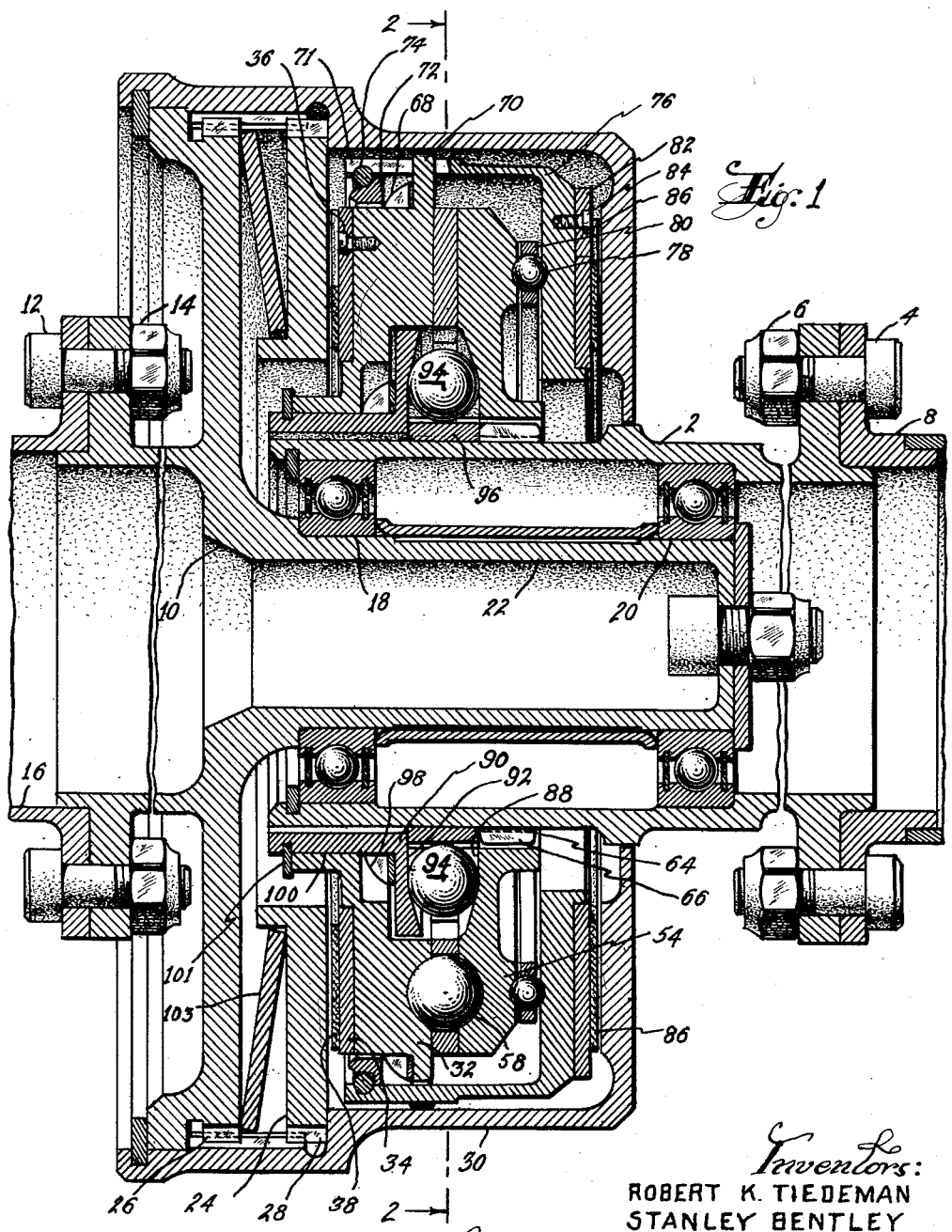

Nov. 27, 1962 R. K. TIEDEMAN ET AL 3,065,833
SPEED AND TORQUE RESPONSIVE CLUTCH
Filed Dec. 23, 1959 5 Sheets-Sheet 2

Inventors:
ROBERT K. TIEDEMAN
STANLEY BENTLEY
By William V. Els
Their Attorney

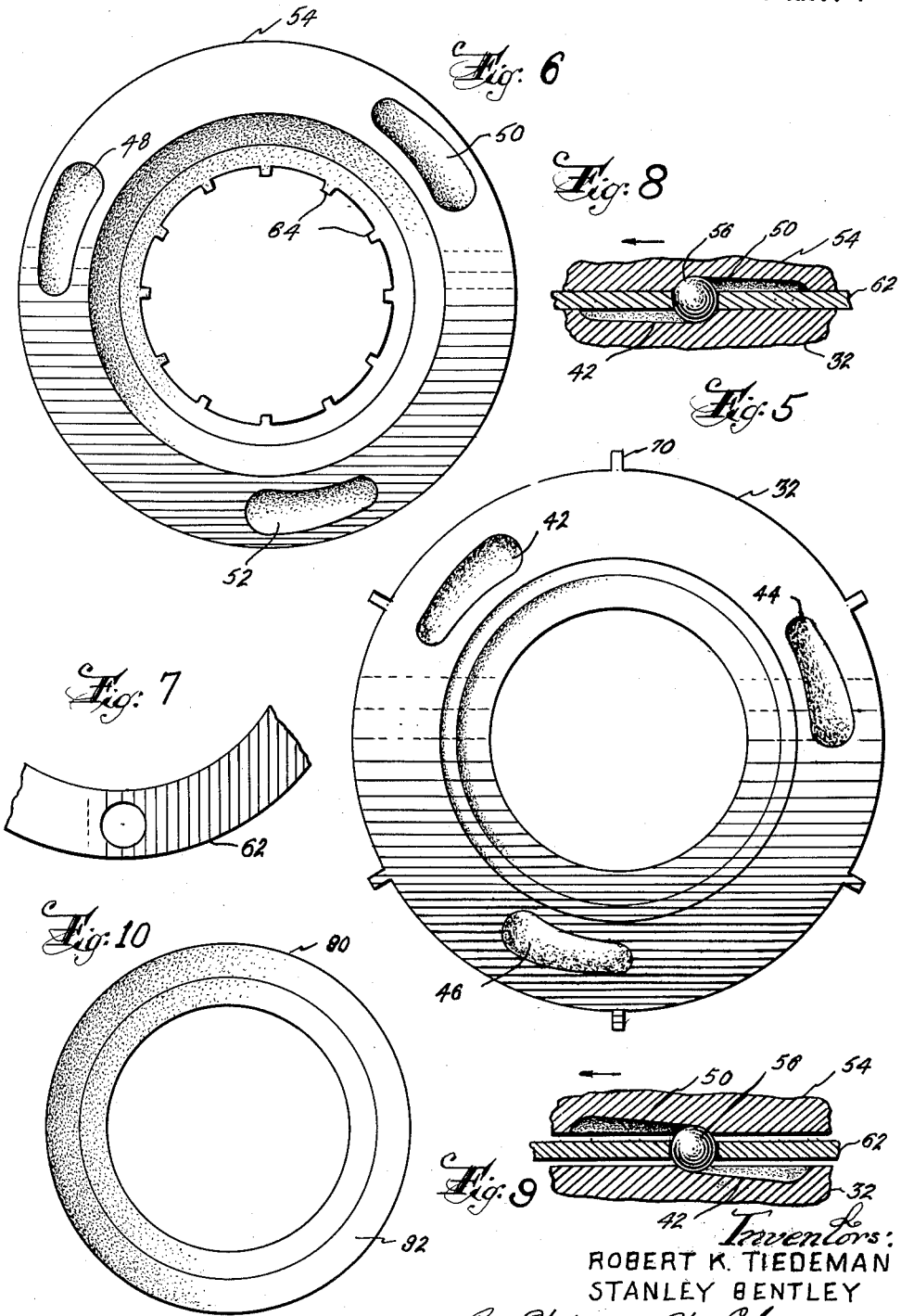

United States Patent Office 3,065,833
Patented Nov. 27, 1962

3,065,833
SPEED AND TORQUE RESPONSIVE CLUTCH
Robert K. Tiedeman and Stanley Bentley, Wayne, N.J., assignors to Curtiss-Wright Corporation, a corporation of Delaware
Filed Dec. 23, 1959, Ser. No. 861,547
6 Claims. (Cl. 192—105)

My invention is directed to a clutch for drivably connecting and disconnecting input and output shafts, which clutch is responsive to both change in speed of the input shaft and change in load torque on the output shaft.

Clutches activated by the outward movement of members in response to centrifugal forces are well known in the art. At a particular speed the members function to bring about the engagement of input and output clutch elements. However, complete interlocking of such clutch elements with a resulting rotation of the output clutch elements at the speed of the input elements generally occurs only at a substantially greater r.p.m. A clean cut response is prevented by the relative movement of clutch plates which persists until sufficient pressure is developed between the driving and driven clutch plates to result in the interlocking of the parts at the higher r.p.m.

An object of this invention is to provide a clutch wherein interlocking of clutch elements occurs quickly and completely at some predetermined r.p.m.

Another object of the invention is to provide such a clutch in which the relative movement of engaging friction surfaces and resulting wear thereon is reduced to a minimum.

Other objects and advantages of the invention will become apparent during a reading of the specification taken in connection with the accompanying drawings.

The clutch of the invention is both speed responsive and torque responsive. At a predetermined speed, clutch elements, which connect with an input and output shaft respectively, engage to thereupon initiate the operation of mechanism which functions to quickly increase the coupling force between the clutch elements. Such mechanism increases the coupling force in proportion to the load torque on the output end of the clutch to assure continued clutch engagement regardless of load. A reduction in the speed of the input shaft results in an overrunning of the output shaft.

Figure 2:
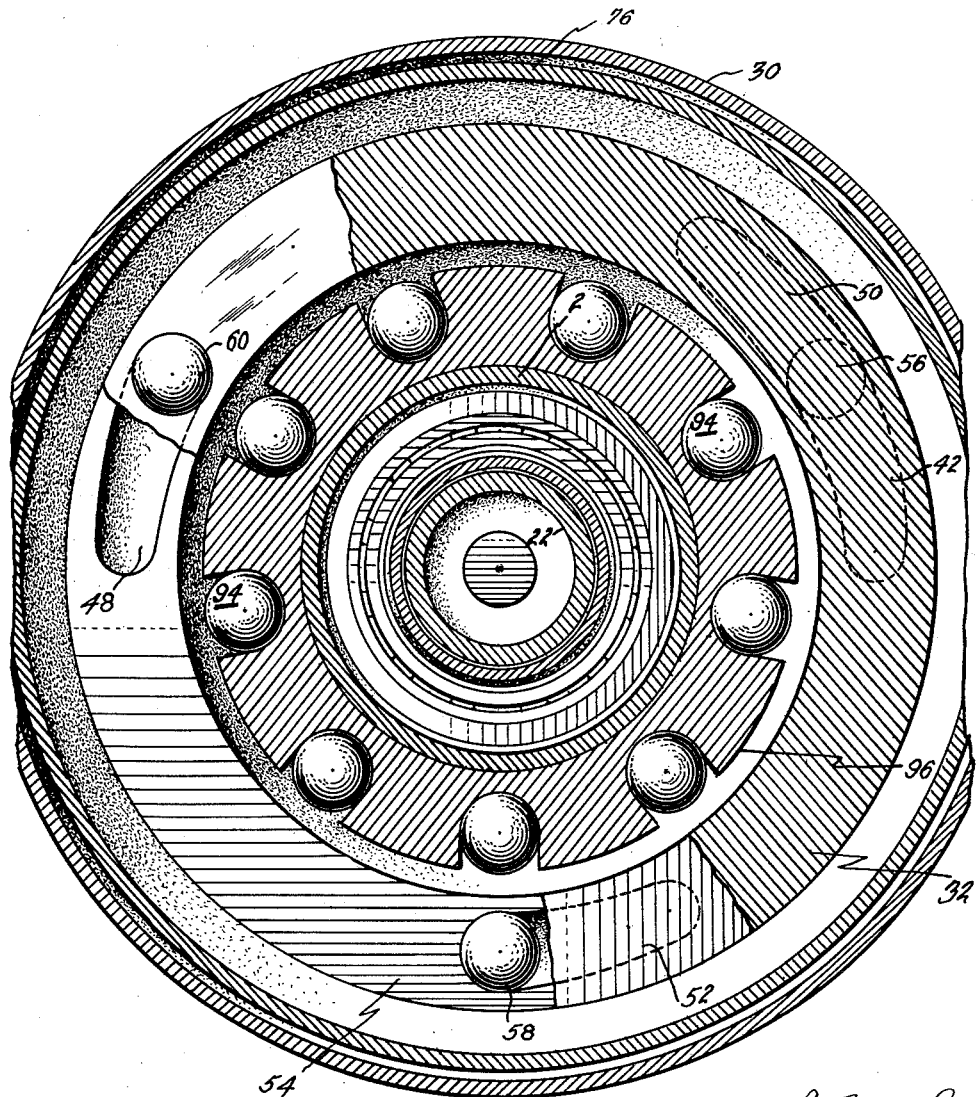
Figure 3:
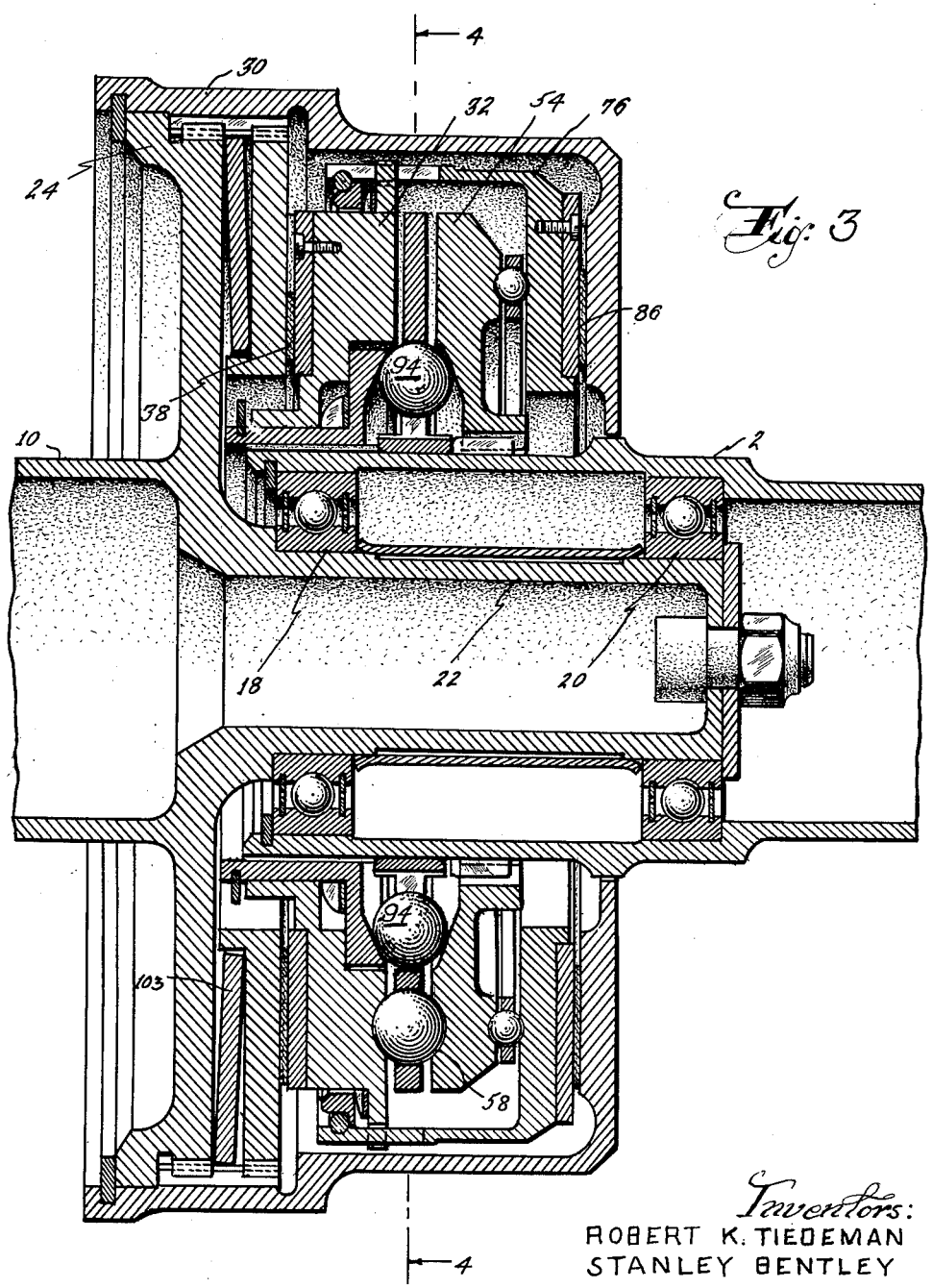
Figure 4:
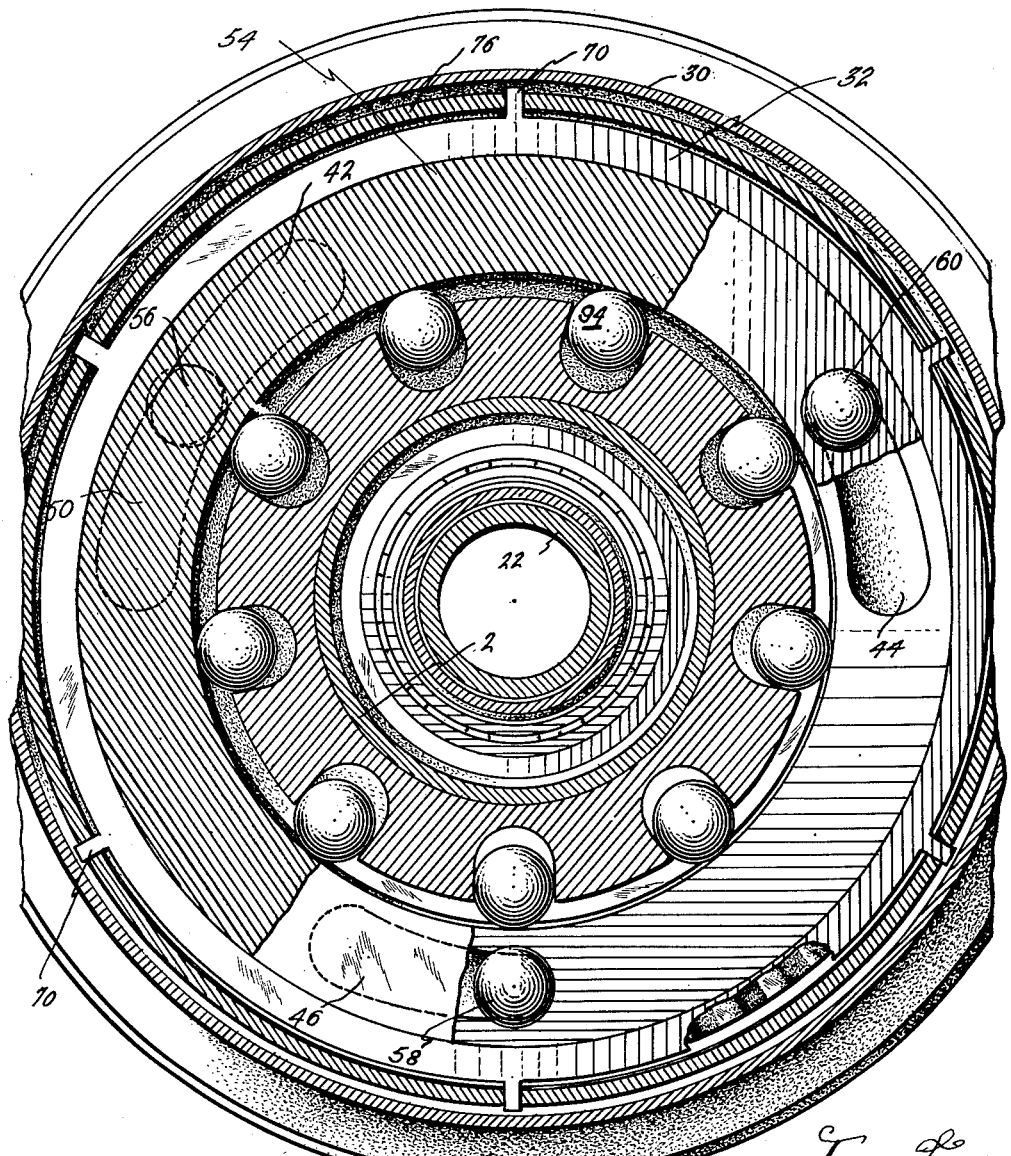

Referring to the drawings:

FIG. 1 is a longitudinal sectional view showing the clutch in a deenergized condition, FIG. 2 is a cross sectional view taken substantially on the plane of the line 2—2 of FIG. 1, FIG. 3 is a view similar to FIG. 1 showing the clutch in the energized condition and loaded to capacity, FIG. 4 is a cross sectional view taken substantially on the plane of the line 4—4 of FIG. 3, FIG. 5 is a face view of a portion of the device showing cam surfaces of mechanism used to increase the coupling force between clutch elements, FIG. 6 is a face view of another portion of the device showing complementary cam surfaces, FIG. 7 is a fragmentary view of a retainer for balls which ride on the said cam surfaces, FIG. 8 is a fragmentary edge view showing the complementary cam surfaces of FIGS. 5 and 6 in unactuated positions, FIG. 9 is a view similar to FIG. 8 showing the cams in extreme actuated positions, FIG. 10 is a face view of a speed responsive element of the device.

In the drawings (FIGS. 1–4), reference character 2 designates a rotatable input clutch member which connects as by bolts and nuts 4 and 6 respectively with a drive shaft 8. Reference character 10 designates the clutch output member which connects by nuts and bolts 12 and 14 respectively with an output shaft 16. As shown, input clutch member 2 is supported on bearings 18 and 20 which are disposed between the clutch input member and an extension 22 of the output clutch member 10. The output member 10 is drivably connected with output clutch element 24, such parts being keyed at 26 and 28 respectively to a common member 30. Member 10, clutch element 24 and member 30 are therefore, all structures rotationally fixed with respect to the output shaft. The output element 24 is rotated during effective operation of the clutch by element 32, such element including a ring 34 secured thereto as by screws 36 and friction surface 38 on the ring engageable with the output element 24. Element 32 drivably connects with input member 2 through camming means.

The camming means connecting element 32 and input member 2 includes a plurality of cam surfaces 42, 44 and 46 on the element 32, the complementary cam surfaces 48, 50 and 52 respectively on the element 54, and balls 56, 58 and 60 (FIGS. 3 and 4) which ride on the complementary pairs of cam surfaces. As shown, the cam surfaces define circumferentially extending recesses of varying depth in the elements 32 and 54 (FIGS 5, 6, 8 and 9). In the deenergized condition of the clutch the balls 56, 58 and 60 are located in the deepest portions of the recesses of respective pairs of complementary cam surfaces (see FIGS. 2 and 8), being forced into such positions by the squeezing action of elements 32 and 54 which are spring biased toward each other. As will be explained hereinafter the elements 32 and 54 move relative to each other to bring about clutch engagement. At such time the balls 56, 58 and 60 are moved into shallower portions of the cam recesses. An extreme position for the cam surfaces and balls is shown in FIGS. 4 and 9. The balls 56, 58 and 60 are held in relative fixed spaced relationship in ball retainer 62, respective sides of which in the deenergized condition of the clutch contacts element 32 and element 54.

The element 54 is spline connected for rotation by input member 2, splines 64 on element 54 being engageable by splines 66 on the member 2. Element 32 and element 54 are biased toward each other by the washerlike spring 68 which acts against a projection 70 on element 32, and a retainer 72 which in turn bears against a snap ring 74 in member 76. Member 76 acts on the element 54 through balls 78 in the retainer 80. Member 76 includes the plate 82 secured thereto as by screws 84 and friction surface 86 thereon which is engageable with member 30.

Element 54 includes an angular surface 88. A member 90 rotatably mounted on input member 2 includes a similarly formed angular surface 92 disposed oppositely and in axial alignment with the surface 88. A plurality of radially movable balls 94 disposed between member 90 and element 54 move outwardly and inwardly along surfaces 88 and 92 as explained hereinafter to initiate and discontinue clutch operation. As shown, these balls are circumferentially spaced in a retainer 96 (FIGS. 2 and 4). The balls are urged radially inwardly by the action of washer-like spring 98 which acts against element 32 and member 90. The spring 98 is a stiffer spring than the aforementioned spring 68 which urges the elements 32 and 54 toward each other.

In the deenergized condition of the clutch there is a gap between friction surface 38 and member 24. There is also a gap between friction surface 86 and member 30. The balls 94 occupy the position shown in FIG. 1. Assuming that input clutch member 2 is rotated by drive shaft 8 in a clockwise direction as viewed in FIG. 2, element 54 is rotated by reason of its spline connection with member 2. Element 54 acts through the cam connection between elements 54 and 32 to impart rotation to the element 32 including the ring 34 and friction surface 38. Element 32 acting through projection 70 which is keyed in a slot 71 of member 76 transmits a turning torque to member 76 whereby member 76 rotates with plate 82 and friction surface 86. Member 90 is caused to rotate by reason of its contact along surface 100 and through the retainer 101 and spring 98 with element 32. The balls 94 and retainer 96 are also caused to rotate by reason of the contacting relationship between these parts and parts 54 and 90. Centrifugal force acting on the balls 94 causes them to move radially outwardly along surfaces 88 and 92. The balls 94 acting directly on element 54 and acting on the element 32 through spring 98 moves elements 32 and 54 apart against the biasing force of spring 68. At a predetermined speed slightly greater than the idling speed of input shaft 2, centrifugal force is sufficiently great to move the balls outwardly far enough to result in the closure of the gaps between friction surface 38 and member 24, and between friction surface 86 and member 30.

Assuming a load on the output shaft, the engagement of friction surface 38 with member 24 results in element 32 being temporarily held relative to rotating element 54 such that element 54 rotates relative to element 32 on bearing 78, the member 76 in engagement with bearing 78 being temporarily held against rotation at such time by projections 70 in slots 71 of the member 76. Rotation of element 54 relative to element 32 results in cam surfaces 48, 50 and 52 being moved circumferentially relative to cam surface 42, 44 and 46 respectively. This causes the balls which in the idling condition of the clutch are substantially disposed in the deepest part of the recesses defined by the complementary cam surfaces to be moved to shallower portions of the cams. This positioning of the balls in the shallower portions of the cam recesses results in the elements 32 and 54 being moved axially in opposite directions against the action of spring 68 such that friction surface 38 is caused to bear on member 24 in opposition to the spring action of Belleville washer 103 with additional pressure over that due to radial movement of the balls 94. Driving torque transmitted to the output shaft is quickly increased and the output shaft is caused to rotate at the speed of the input shaft with the balls 56, 58 and 60 of the cam operated means in some intermediate position on the respective pairs of cam surfaces.

Friction surface 86 and member 30 interact in response to the relative movement of elements 54 and 32 in a similar manner to the responsive interaction of friction surface 38 and member 24. Member 30 which rotates with the output shaft imparts rotation through friction surface 86 and member 82 to member 76 when the clutch is energized. When the clutch is deenergized friction surface 86 is disengaged from member 30 and the member 76 is rotated through projections 70 acting in slots 71 by element 32.

As the speed of the input shaft is reduced from above idling speed with the load being substantially constant, an adjustment of elements 32 and 54 occurs with the balls 56, 58 and 60 being moved into the deepest portions of the cam recesses. Such adjustment is facilitated by antifriction bearing 78, the bearing permitting element 54 to move relative to element 32 without frictional restraint by member 76 which is held against rotation relative to element 54 by projections 70 in slots 71. The action of spring 68 assures the separation of friction surface 38 from member 24 and of friction surface 86 from member 30. The result is an overrunning of the output shaft with respect to the input shaft. As input speed is reduced below idling speed balls 94 move radially inward assuming their original position (FIG. 1) when the input shaft ceases to rotate. If an increase of load should result in a decrease of speed of the input and output shafts during clutch energization, elements 54 and 32 adjust to move balls 56, 58 and 60 into shallower portions of the cam recesses increasing the pressure between friction surface 38 and member 24, and no decoupling of the engaging clutch elements occurs at idling speed.

The operation of the camming means occurs quickly when the input shaft speed is increased above idling speed to interlock the input and output elements of the clutch. A defined type of operation therefore occurs, that is the clutch engages at some definite input speed and marginal operation over a wide range of speeds as commonly experienced in centrifugal type of clutches is eliminated. The clutch is responsive to changes in the load on the output shaft, elements 32 and 54 moving relative to each other upon an increase in load to increase pressure between clutch engaging surfaces and thereby prevent slippage and reduce resulting wear on these parts. As input torque is increased and the balls 56, 58 and 60 move into shallower portions of the cam recesses in elements 32 and 54, clutch element 24 moves to the left as viewed in FIGS. 1 and 3 against the force of Belleville washer 103. At a maximum permissible torque determined by the stiffness of washer 103, clutch element 24 and element 32 attain positions permitting balls 56, 58 and 60 to ride out of the cam recesses whereby the elements 32 and 54 are decoupled and damage to the clutch is prevented.

While only one form of the device incorporating the features of the invention has been shown, it will be apparent that various changes and modifications may be made therein by those skilled in the art without departing from the spirit and scope of the invention as set forth in the appended claims.

We claim:

1. A clutch for drivably connecting and disconnecting input and output shafts comprising a pair of elements rotatable about a common axis and axially slidable, one said element being fixed rotationally with respect to the input shaft; camming means for moving the elements apart axially upon relative rotation of the elements; structure rotationally fixed with respect to the output shaft on each of the opposite sides of the pair of elements; friction means between each of the elements and the structures affixed to the output shaft; a member between said one element and associated friction means rotationally fixed with respect to the other element but axially slidable with said one element; a bearing between said one element and said member for rotatably mounting said one element; means for moving the elements apart to initiate coupling of said member and said other element to said structures at a predetermined speed of the input shaft through the friction means whereby said one element may be rotated in one direction relative to the other element by said input shaft on said bearing to further move the elements apart and thereby increase torque exerted on the output shaft until the output shaft is rotated by said input shaft acting through the elements and friction means; and means for moving the elemnets toward one another upon decrease in speed of the input shaft and said one element relative to the other element whereby the output shaft may overrun the input shaft.

2. A clutch as defined in claim 1 including means for limiting torque transmissible between input and output shafts.

3. A clutch as defined in claim 1 wherein the structure on one side of the pair of the elements is slidable, and wherein said clutch includes a spring which biases said slidable structure toward said other element, the other element being moved in opposition to the force of said spring a sufficient amount to decouple the input and output shaft at the elements in the event of an excessive load on the output shaft.

4. A clutch as defined in claim 1 wherein the means for moving the elements apart to initiate coupling at the predetermined speed of the input shaft acts radially with respect to the axis of rotation of the elements.

5. A clutch as defined in claim 1 wherein the camming means includes several pairs of cam surfaces separated by balls which are positioned between each pair of cam surfaces as the elements rotate relative to each other.

6. A clutch as defined in claim 5 wherein the cam surfaces describe substantially circumferential paths with respect to the axis of rotation of the elements.

References Cited in the file of this patent

UNITED STATES PATENTS

| | | |
|---|---|---|
| 1,974,390 | Eason | Sept. 18, 1934 |
| 2,001,931 | Lyman | May 21, 1935 |
| 2,490,172 | Swahnberg | Dec. 6, 1949 |